N. W. WHITBECK.
VALVE.
APPLICATION FILED MAR. 31, 1916.
1,226,040.
Patented May 15, 1917.
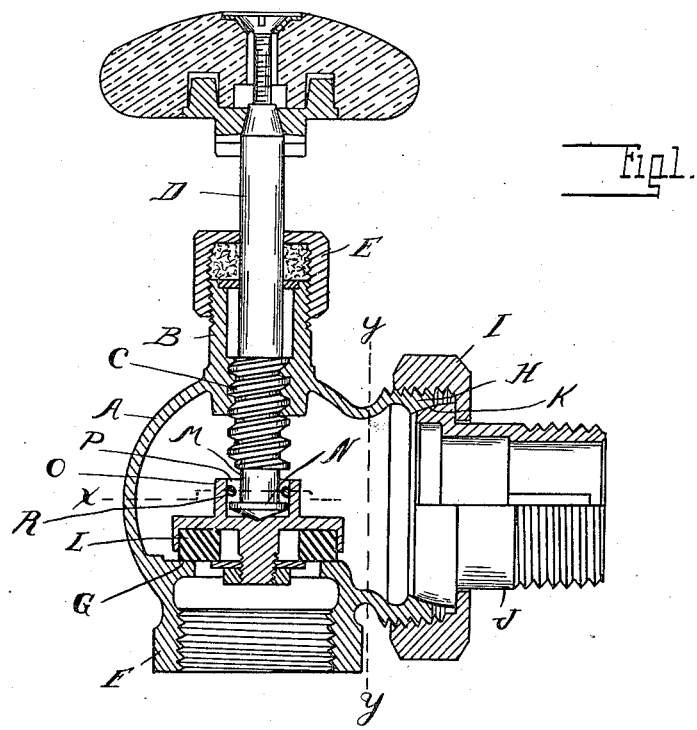
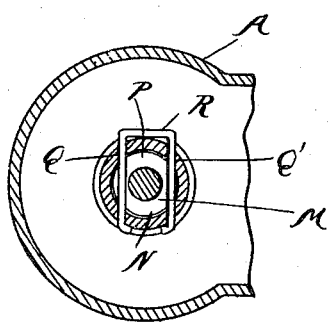
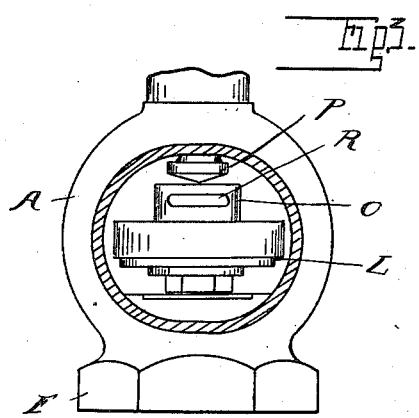
Inventor
Neal W. Whitbeck
By Whittemore Hulbert & Whittemore
Attorneys

UNITED STATES PATENT OFFICE.

NEAL W. WHITBECK, OF DETROIT, MICHIGAN, ASSIGNOR TO MICHIGAN LUBRICATOR COMPANY, OF DETROIT, MICHIGAN, A CORPORATION OF MICHIGAN.

VALVE.

1,226,040.   Specification of Letters Patent.   Patented May 15, 1917.

Application filed March 31, 1916.   Serial No. 87,940.

*To all whom it may concern:*

Be it known that I, NEAL W. WHITBECK, a citizen of the United States of America, residing at Detroit, in the county of Wayne and State of Michigan, have invented certain new and useful Improvements in Valves, of which the following is a specification, reference being had therein to the accompanying drawings.

The invention relates to valves more particularly designed for use in connection with steam radiators and similar apparatus, and it is the object of the invention to obtain a simplified construction which may be manufactured at lower cost than the standard constructions heretofore used.

In the drawings:

Figure 1 is a longitudinal section through the valve;

Fig. 2 is a horizontal section therethrough on line $x$—$x$; and

Fig. 3 is a section on line $y$—$y$.

In the construction of radiator valves, it is the usual practice to form the valve casing with an enlarged aperture in the top thereof sufficient for the introduction of the valve disk, and to provide a cap or bonnet for closing this aperture, on which is formed the bearing for the valve stem, the packing gland and other parts. This two-part construction of the case increases the cost of manufacture and also introduces an additional joint where there is the necessity for packing and chance of leakage. Inasmuch, however, as the aperture in the valve-seat is necessarily less than the diameter of the valve disk, it is impossible to introduce the latter from below the seat, and therefore the bonnet-closed aperture at the top has been deemed necessary. With my improved construction the bonnet is dispensed with, the valve stem being introduced through the inlet nipple from below the valve seat, and the valve disk being introduced laterally through the outlet nipple to a position above the seat. There is also provided a simple construction of connecting means between the stem and the disk, providing a swivel engagement and also sufficient universal freedom for perfect seating of the disk.

In detail, A is the valve case, which has formed integral therewith the nipple B interiorly threaded to engage a threaded portion C of the valve stem D, and interiorly threaded for engagement of the cap or packing gland E. The valve casing is also provided with the inlet nipple F, which is in concentric alinement with the nipple B, the valve-seat G being arranged within the case between said nipples. H is a laterally-extending outlet nipple, which is exteriorly threaded for engagement with a union I for clamping a detachable exteriorly threaded nipple J in position, said nipple having a conical end portion K for seating in a corresponding bearing in the nipple H.

The diameter of the opening in the nipple H is greater than that required for the valve disk L, which may therefore be introduced laterally through this opening into the case above the seat G.

The valve stem D is also capable of being introduced through the nipple F into the nipple B, with its threaded portion C in engagement therewith. Thus as shown in Fig. 3, the stem being in the position therein indicated the disk may be slipped into alinement therewith and then dropped to rest upon its seat. To secure the stem and the disk to each other, a groove M is cut in the stem above its lower end, leaving a flange or collar N. The valve disk is provided with an upwardly-projecting lug O having a recess P therein for receiving the flange N and also with a pair of spaced bores Q and Q', which intersect said recess upon opposite sides of the reduced or grooved portion of the stem. R is a securing member of U-shaped form, which is inserted through the spaced bores Q and Q', passing through the groove M in the stem and the ends thereof being bent over to clench to hold the same from disengagement. The fastening device may be readily inserted when the valve disk is resting upon its seat and the stem is screwed downward into the recess P. When thus secured the disk is movable longitudinally with the stem, but is free to swivel thereon and also to rock sufficiently to make a perfect contact with the seat.

What I claim as my invention is:

1. A valve, comprising a casing having alined and opposite nipples, a valve seat therebetween and a laterally-extending nipple, one of said alined nipples being interiorly threaded, a threaded valve stem insertible into engagement with said interiorly-threaded nipple through said alined nipple and the aperture in the valve seat, said stem having an annular groove adjacent one end a valve disk insertible through said lateral nipple above said seat into alinement with said stem and provided with a recess for receiving the grooved end of said stem, and a coupling between said disk and stem, comprising a U-shaped member insertible through spaced apertures in said disk embracing said stem and engaging in the groove thereof, and allowing the valve disk both to rotate and rock relative to the stem.

2. A valve, comprising a casing having alined opposite nipples with a valve seat therebetween and a laterally-extending nipple, one of said alined nipples being interiorly threaded, of a threaded valve stem insertible into engagement with the threaded nipple and the aperture in said valve seat, a valve disk insertible through said lateral nipple above said valve seat into alinement with said valve stem, said disk being provided with a projecting boss recessed to receive the end of said stem and said stem having a groove in the portion engaging said recess, a member for securing said disk to said stem of U-shaped form, engaging apertures in said boss on opposite sides of said stem and intersecting the groove in said stem, said member being insertible through said lateral nipple and having a projecting end clenched to hold the same from disengagement, the valve disk being free to rotate and rock relative to its stem.

In testimony whereof I affix my signature.

NEAL W. WHITBECK.